United States Patent
Ito et al.

(10) Patent No.: US 10,696,865 B2
(45) Date of Patent: Jun. 30, 2020

(54) LAMINATED FILM

(71) Applicant: JNC CORPORATION, Tokyo (JP)

(72) Inventors: Kenya Ito, Chiba (JP); Hiroyuki Iizuka, Chiba (JP); Shino Sato, Chiba (JP); Yasuhiro Shiraishi, Chiba (JP)

(73) Assignee: JNC CORPORATION, Tokyo (JP)

( * ) Notice: Subject to any disclaimer, the term of this patent is extended or adjusted under 35 U.S.C. 154(b) by 132 days.

(21) Appl. No.: 15/721,747

(22) Filed: Sep. 30, 2017

(65) Prior Publication Data

US 2018/0094164 A1    Apr. 5, 2018

(30) Foreign Application Priority Data

Sep. 30, 2016   (JP) .................................. 2016-193996

(51) Int. Cl.
| | | |
|---|---|---|
| *C09D 175/12* | (2006.01) | |
| *C08G 18/24* | (2006.01) | |
| *C08G 18/44* | (2006.01) | |
| *C08G 18/38* | (2006.01) | |
| *C08G 18/32* | (2006.01) | |
| *C08G 18/66* | (2006.01) | |
| *C08G 18/75* | (2006.01) | |
| *B32B 7/12* | (2006.01) | |
| *B32B 27/36* | (2006.01) | |
| *B32B 27/08* | (2006.01) | |

(Continued)

(52) U.S. Cl.
CPC .............. *C09D 175/12* (2013.01); *B32B 7/12* (2013.01); *B32B 27/08* (2013.01); *B32B 27/365* (2013.01); *C08F 290/067* (2013.01); *C08G 18/242* (2013.01); *C08G 18/246* (2013.01); *C08G 18/3206* (2013.01); *C08G 18/3838* (2013.01); *C08G 18/4202* (2013.01); *C08G 18/44* (2013.01); *C08G 18/664* (2013.01); *C08G 18/755* (2013.01); *C08G 18/7671* (2013.01); *C08G 18/8116* (2013.01); *C09D 151/08* (2013.01); *C09D 175/16* (2013.01); *C09J 7/29* (2018.01); *B32B 2255/10* (2013.01); *B32B 2255/26* (2013.01); *C08G 2170/40* (2013.01); *C09J 2201/122* (2013.01); *C09J 2201/162* (2013.01); *C09J 2201/606* (2013.01); *C09J 2433/00* (2013.01); *C09J 2475/006* (2013.01)

(58) Field of Classification Search
CPC . B32B 27/40; B32B 2250/03; B32B 2405/00; B32B 2571/00
See application file for complete search history.

(56) References Cited

U.S. PATENT DOCUMENTS

2007/0014018 A1*  1/2007  Wheatley ............... G02B 1/105
                                                                    359/580
2013/0258482 A1* 10/2013  Takahashi ............. G02B 1/111
                                                                    359/601

FOREIGN PATENT DOCUMENTS

| JP | 2008-539107 | 11/2008 |
|---|---|---|
| JP | 2016-020079 | 2/2016 |

(Continued)

*Primary Examiner* — Alexandre F Ferre
(74) *Attorney, Agent, or Firm* — JCIPRNET

(57) ABSTRACT

A laminated film appropriate as a PPF material which has a three-layer structure in which a top coating layer including a urethane acrylate cured product, a substrate layer including polycarbonate thermoplastic polyurethane, and an adhesive layer including a pressure sensitive adhesive are in contact in that order. Preferably, the top coating layer includes a unit derived from γ-methacryloxypropylhepta(trifluoropropyl)-T8-silsesquioxane.

5 Claims, 3 Drawing Sheets

(51) Int. Cl.
*C08G 18/76* (2006.01)
*C08F 290/06* (2006.01)
*C08G 18/42* (2006.01)
*C08G 18/81* (2006.01)
*C09J 7/29* (2018.01)
*C09D 175/16* (2006.01)
*C09D 151/08* (2006.01)

(56) References Cited

FOREIGN PATENT DOCUMENTS

| WO | WO-2015019726 A1 * | 2/2015 | ......... C08G 18/5015 |
| WO | WO-2016152631 A1 * | 9/2016 | ................ C09J 7/20 |

* cited by examiner

LAMINATED FILM

CROSS-REFERENCE TO RELATED APPLICATIONS

This application claims the priority benefit of Japanese application serial no. 2016-193996, filed on Sep. 30, 2016. The entirety of the above-mentioned patent application is hereby incorporated by reference herein and made a part of this specification.

BACKGROUND OF THE INVENTION

Field of the Invention

The present invention relates to a laminated film that can be used as a material of a paint protection film.

Description of Related Art

A paint protection film (PPF) is a film-like product that is used for surface protection of an industrial product used outdoors. A basic structure of the PPF is a laminate that includes at least two layers including a substrate made of a flexible and transparent resin film and an adhesive layer. In general, a laminated film in a form that includes a coating layer for enhancing a stainproof function and scratch resistance of a substrate on a surface opposite to the adhesive layer of the substrate, and further includes a release layer on a surface opposite to the substrate of the adhesive layer is supplied in the market. When the PPF is used, first, the PPF is cut according to a surface part to be protected, and an adhesive layer of the cut PPF is brought into close contact with a target surface. A product whose surface is covered with a PPF is protected from various stimuli from the outside such as dirt and scratches due to wind and rain, dust, sand, river water, microorganisms and contact with or excretions of animals and plants and insects while a coating, shape, and exterior of the product are not impaired. Specifically, the PPF serves as a so-called cushion and absorbs a pressure or strike from the outside, and the PPF repels rainwater and dirt. Therefore, effects of external stimulation on the product itself are minimized.

Initially, such a PPF was developed for industrial products used in a harsh environment such as an airplane, but it is becoming popular as a protection member of a surface of a body such as an automobile and a motorbike nowadays. For example, when a roof, hood, front, doors, and trunk door of an automobile are covered with a PPF, the body can be protected from bird feces, insect carcasses, cat footprints, malicious actions, scratches during transport, or scratches due to scattered stones which bother a driver. In general, when a surface covered with a PPF is washed with water, since it is possible to simply remove dirt on the surface of the PPF, the PPF exhibits its function for a relatively long period. The PPF used for a certain period can be separated from the body and simply replaced with a new PPF.

Due to the recent spreading of vehicles such as automobiles and motorbikes worldwide, there is a demand for PPFs that can be used in wider environments, for example, in more severe climates such as cold areas, tropical areas, and arid areas. Moreover, with the expansion of the PPF market, PPFs that can be appropriately applied by a worker without special skills more simply are desirable. Therefore, in recent PPFs, various aspects of performance such as flexibility for adaption to variable surface shapes of automobiles or motorbikes, durability to withstand stimulation from the outside for a long period, transparency and smoothness for preventing an exterior of the product itself from being impaired, and favorable detachability during replacement have been required.

As such a PPF, for example, in Patent Document 1, there is provided a PPF which has excellent sticking characteristics and in which there is less adhesive residue by laminating a substrate film and an adhesive layer whose surface roughness is controlled. However, in this PPF, a detailed examination of a stainproof layer added to a surface of the substrate film was not performed, and there was a problem in practicality for automobiles and motorbikes whose exteriors are considered to be important.

In addition, for example, in Patent Document 2, a PPF in which a first layer containing polyurethane, a second layer containing a thermoplastic polyurethane, and a third layer containing a pressure sensitive adhesive are laminated in that order is described. However, further improvement in various aspects of performance is required for this PPF.

CITATION LIST

Patent Documents

[Patent Document 1] Japanese Unexamined Patent Application Publication No. 2016-20079.

[Patent Document 2] Japanese Unexamined Patent Application Publication (Translation of PCT Application) No. 2008-539107.

SUMMARY OF THE INVENTION

Problems to be Solved

Here, the inventors studied a configuration of an optimal laminate in order to further improve various aspects of performance of a PPF.

Means of Solving the Problem

As a result, the inventors found that a laminated film having a three-layer structure in which a top coating layer including a urethane acrylate cured product, a substrate layer including polycarbonate thermoplastic polyurethane, and an adhesive layer including a pressure sensitive adhesive are in contact in that order exhibits various aspects of performance required for a PPF, particularly, excellent heat resistance and weather resistance. Moreover, the inventors found that, when a fluorine-containing compound and typically a urethane acrylate cured product including a structural unit derived from a fluorosilsesquioxane derivative is used in the top coating layer, the laminate exhibits particularly excellent performance. That is, the present invention is as follows.

(1) A laminated film having a three-layer structure in which a top coating layer containing a urethane acrylate cured product, a substrate layer made of polycarbonate thermoplastic polyurethane, and an adhesive layer made of a pressure sensitive adhesive are in contact in that order.

(2) The laminated film according to (1), wherein the urethane acrylate cured product includes fluorine atoms.

(3) The laminated film according to (1) or (2), wherein the urethane acrylate cured product includes a structural unit derived from a fluorosilsesquioxane derivative represented by the following Formula (1).

[Chem. 1]

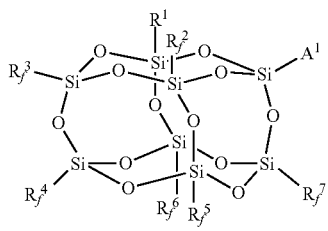

(1)

In Formula (1), $R_f^1$ to $R_f^7$ each independently represent a linear fluoroalkyl group having 1 to 20 carbon atoms or a branched fluoroalkyl group having 3 to 20 carbon atoms in which any methylene group may be substituted with oxygen; a fluoroaryl group having 6 to 20 carbon atoms in which at least one hydrogen atom is substituted with fluorine or a trifluoromethyl group; or a fluoroarylalkyl group having 7 to 20 carbon atoms in which at least one hydrogen atom in an aryl group is substituted with fluorine or trifluoromethyl, and $A^1$ is a group represented by the following Formula (1-1) or Formula (1-2).

[Chem. 2]

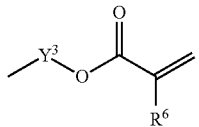

(1-1)

In Formula (1-1), $Y^3$ represents an alkylene group having 2 to 10 carbon atoms and preferably an alkylene group having 2 to 6 atoms, $R^6$ represents hydrogen or a linear alkyl group having 1 to 5 carbon atoms or a branched alkyl group having 3 to 5 carbon atoms, or an aryl group having 6 to 10 carbon atoms, and preferably hydrogen or an alkyl group having 1 to 3 atoms.

[Chem. 3]

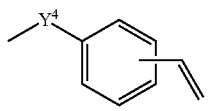

(1-2)

In Formula (1-2), $Y^4$ represents a single bond or an alkylene group having 1 to 10 carbon atoms. (4) The laminated film according to any one of (1) to (3), wherein the urethane acrylate cured product includes a structural unit derived from γ-methacryloxypropylhepta(trifluoropropyl)-T8-silsesquioxane represented by the following Formula (5).

[Chem. 4]

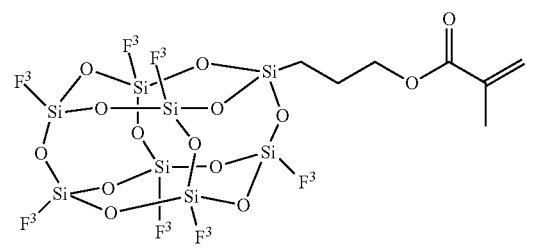

(5)

$F^3$: —$CH_2CH_2CF_3$ (5) The laminated film according to any one of (1) to (4), further including a release layer.

(6) A paint protection film (PPF) including the laminated film according to any one of (1) to (5).

Effects of the Invention

A laminated film of the present invention has excellent heat resistance and weather resistance and has excellent balance between a self-repairing property, water repellency, a stainproof property, oil repellency, extensibility, surface lubricity, an adhesive strength, and a design property. Such a laminated film of the present invention is appropriate as a material of a PPF.

DESCRIPTION OF THE EMBODIMENTS

Figure 1:
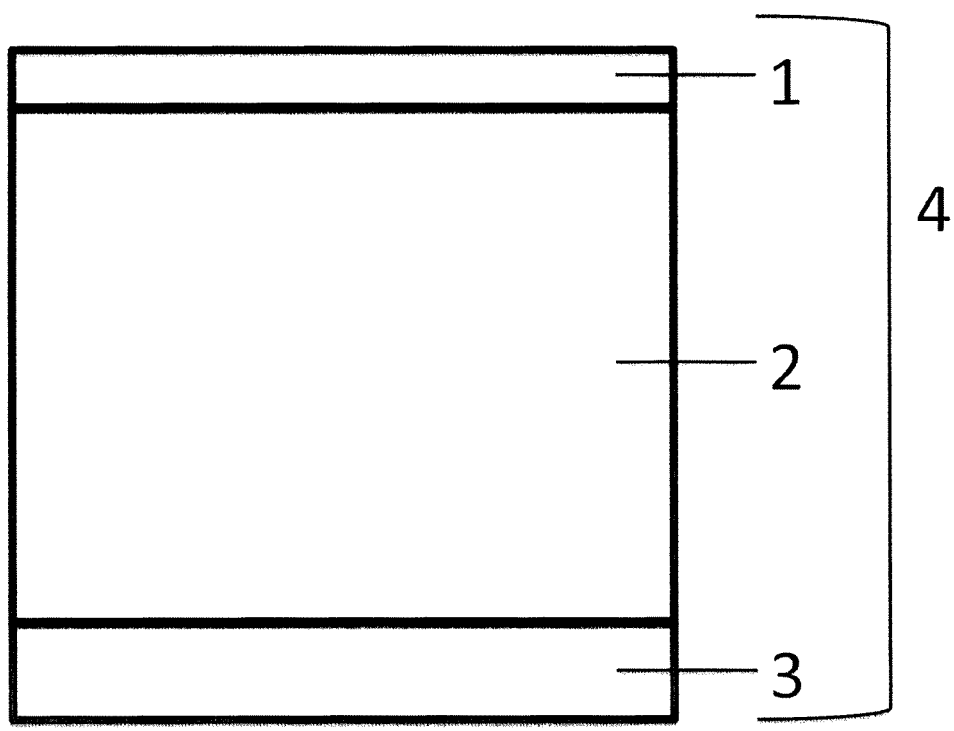
FIG. 1 is one example of a laminated film of the present invention.

A laminated film of the present invention is a laminate that includes a top coating layer containing a urethane acrylate cured product, a substrate layer made of a polycarbonate thermoplastic polyurethane (TPU), and an adhesive layer containing a pressure sensitive adhesive, and typically, is a film obtained by laminating the top coating layer, the substrate layer, and the adhesive layer in that order. For example, as shown in FIG. 1, a top coating layer 1, the substrate layer 2 and the adhesive layer 3 are laminated in that order so as to form a laminated film 4. The top coating layer, the substrate layer, and the adhesive layer will be described below in detail.

[1. Top Coating Layer]

The top coating layer of the present invention essentially contains a urethane acrylate cured product. The urethane acrylate cured product is a resin obtained by curing a curable urethane acrylate oligomer (a so-called urethane acrylate) in the presence of a polymerization initiator. The top coating layer of the present invention is formed by curing a top coating solution layer that essentially contains the urethane acrylate and the polymerization initiator on the substrate. The thickness of the top coating layer in the laminated film of the present invention is generally 1 to 100 μm, preferably 10 to 50 μm, and more preferably 10 to 30 μm.

[1.1. Urethane Acrylate]

The urethane acrylate is a general term for an oligomeric compound which is obtained by a reaction of an isocyanate compound, a polyol, a hydroxyl group-containing (meth) acrylic monomer, and an isocyanate group-containing (meth)acrylic monomer, and which includes a reactive acryloyl group at its terminal.

The urethane acrylate used in the present invention is typically a UV curable urethane acrylate, and preferably, a urethane acrylate obtained by reacting an isocyanate compound which may be an aliphatic isocyanate compound and/or an alicyclic isocyanate compound with at least one polyol compound selected from among an ester polyol, an ether polyol, and a polycarbonate polyol, and an acrylate compound having a hydroxyl group.

As the aliphatic isocyanate compound, for example, hexamethylene diisocyanate, an isocyanurate modified product of hexamethylene diisocyanate, and trimethylhexamethylene diisocyanate may be exemplified. As the alicyclic isocyanate compound, for example, isophorone diisocyanate, 4,4'-dicyclohexylmethane isocyanate, and hydrogenated xylene diisocyanates may be exemplified.

As the ester polyol, for example, an ester compound obtained by reacting diols with a dicarboxylic acid may be exemplified. As the diols, for example, 3-methyl-1,5-pentanediol, neopentyl glycol, ethylene glycol, diethylene glycol, propylene glycol, dipropylene glycol, 1,3-butanediol, 1,4-butanediol, 1,6-hexanediol, 2-methyl-1,8-octanediol, and 1,9-nonanediol may be exemplified. As the dicarboxylic acid, sebacic acid, adipic acid, dimer acids, succinic acid, azelaic acid, maleic acid, terephthalic acid, isophthalic acid, and citraconic acid may be exemplified, and an anhydride thereof may be used.

As the ether polyol, for example, polyether diol, poly(oxytetramethylene)glycol, and poly(oxybutylene)glycol may be exemplified. As a specific example of the polyether diol, polybutylene glycol, polyethylene glycol, polytetramethylene glycol, and propylene-modified polytetramethylene glycol may be exemplified.

As the polycarbonate polyol, for example, a reaction product of a carbonate derivative and diols may be exemplified. As an example of the carbonate derivative, a diaryl carbonate such as diphenyl carbonate, dimethyl carbonate, and diethyl carbonate may be exemplified. In addition, as the diols, the above compounds may be exemplified.

As the acrylate compound having a hydroxyl group, 2-hydroxyethyl (meth)acrylate, 2-hydroxypropyl (meth) acrylate, 2-hydroxybutyl (meth)acrylate, 4-hydroxybutyl methacrylate, polyethylene glycol mono(meth)acrylate, polypropylene glycol mono(meth)acrylate, and the like may be exemplified.

In production of such a urethane acrylate, an isocyanate compound, a polyol compound, and an acrylate compound having a hydroxyl group which are essential components can be reacted in a collective manner. Alternatively, an isocyanate compound and a polyol compound are first reacted to prepare a prepolymer having excess isocyanate groups, and then a residual isocyanate group can be reacted with a (meth)acrylate compound having a hydroxyl group. Alternatively, a (meth)acrylate compound having a hydroxyl group is first reacted with such isocyanate compounds to prepare a prepolymer having excess isocyanate groups, and then a residual isocyanate group can be reacted with a polyol compound. Alternatively, an isocyanate compound is first reacted with a urethane group-containing diol compound to prepare a prepolymer having extra hydroxyl groups, and a residual hydroxyl group is then reacted with a polyisocyanate compound to prepare a prepolymer having a hydroxyl group at its terminal. Then, additionally, a terminal hydroxyl group of the prepolymer can be reacted with an isocyanate group-containing (meth)acrylate compound.

In the present invention, as the urethane acrylate, Shikoh UT-5569 (commercially available from Nippon Synthetic Chemical Industry Co., Ltd.), and RUA-062S and RUA-058SY2 (commercially available from Asia Industry Co., Ltd.) can be used.

[1.2. Polymerization Initiator]

As a polymerization initiator used for curing the urethane acrylate in the present invention, those distributed as photopolymerization initiators can be used without limitation. For such a photopolymerization initiator, for example, a hydroxyketone polymer material such as oligo{2-hydroxy-2-methyl-1-phenylpropanone}, 1-hydroxydicyclohexyl phenylketone, 2-hydroxy-2-methyl-1-phenylpropan-1-one, 2,2-dimethoxy-1,2-diphenylethan-1-one, 1-{4(2-hydroxyethoxy)phenyl}2-hydroxy-2-methyl-1-propane 1-one, 2,4,6-trimethylbenzoyl diphenyl phosphine oxide, and bis(2,4,6 trimethylbenzoyl)phenylphosphine oxide can be used.

[1.3. Other Copolymer Components]

In the present invention, when the urethane acrylate is cured, other copolymer components can be added. As such a copolymer component, a compound (hereinafter referred to as a "copolymer component") having a group reactive with a urethane acrylate at its terminal can be used without limitation. As such a copolymer component, a compound that is generally called a photocurable acrylic monomer, for example, a monofunctional acrylate such as (meth)acrylic acid, (meth)acrylic ester, and a hydroxy group-containing (meth)acrylate ester, a bifunctional acrylate such as (poly) alkylene glycol di(meth)acrylate, and a trifunctional or higher functional acrylate such as pentaerythritol triacrylate can be used. Such a copolymer component may be an oligomer obtained by polymerizing a reactive compound containing the photocurable acrylic monomer.

Regarding such a copolymer component, in order to further improve a stainproof property, water repellency, and oil repellency of the top coating layer, it is possible to use a photocurable acrylic monomer and/or oligomer containing fluorine atoms in a molecule. As a commercially available fluorine-containing (meth)acrylate compound that can be used in the present invention, OPTOOL DAC-HP (commercially available from Daikin Industries, Ltd.), MEGAFACE RS-75 (commercially available from DIC), and Viscoat V-3F (commercially available from Osaka Organic Chemical Industry Ltd.) may be exemplified. Such a fluorine-containing (meth)acrylate compound is generally present in a proportion of 0.1 parts by weight to 10 parts by weight with respect to 100 parts by weight of the urethane acrylate, and preferably 1 part by weight to 7 parts by weight.

Further, as the photocurable acrylic monomer containing fluorine atoms in a molecule, a fluorosilsesquioxane derivative (1) represented by the following General Formula (1) can be used.

[Chem. 5]

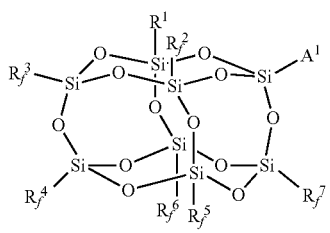
(1)

In Formula (1), $R_f^1$ to $R_f^7$ each independently represent a linear fluoroalkyl group having 1 to 20 carbon atoms or a branched fluoroalkyl group having 3 to 20 carbon atoms in which any methylene may be substituted with oxygen; a fluoroaryl group having 6 to 20 carbon atoms in which at least one hydrogen atom is substituted with fluorine or trifluoromethyl; or a fluoroarylalkyl group having 7 to 20 carbon atoms in which at least one hydrogen atom in an aryl group is substituted with fluorine or trifluoromethyl, and $A^1$ is a group represented by the following Formula (1-1) or Formula (1-2).

Preferably, in Formula (1), $R_f^1$ to $R_f^7$ each independently represent 3,3,3-trifluoropropyl, 3,3,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrododecyl, pentacosafluoro-1,1,2,2-tetrahydrotetradecyl, (3-heptafluoroisopropoxy)propyl, pentafluorophenylpropyl, pentafluorophenyl, or α,α,α-trifluoromethylphenyl.

More preferably, in Formula (1), $R_f^1$ to $R_f^7$ each independently represent 3,3,3-trifluoropropyl or 3,3,4,4,5,5,6,6,6-nonafluorohexyl.

[Chem. 6]

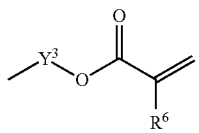
(1-1)

In Formula (1-1), $Y^3$ represents an alkylene group having 2 to 10 carbon atoms and preferably an alkylene group having 2 to 6 carbon atoms, and $R^6$ represents hydrogen, a linear alkyl group having 1 to 5 carbon atoms or a branched alkyl group having 3 to 5 carbon atoms, or an aryl group having 6 to 10 carbon atoms, and preferably hydrogen or an alkyl group having 1 to 3 carbon atoms.

[Chem. 7]

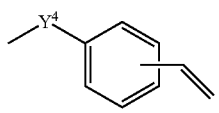
(1-2)

In Formula (1-2), $Y^4$ represents a single bond or an alkylene group having 1 to 10 carbon atoms.

The fluorosilsesquioxane derivative (1) is produced by the following method. First, when a silicon compound (2) having a trifunctional hydrolyzable group represented by the following Formula (2) is hydrolyzed and polycondensed in an oxygen-containing organic solvent in the presence of an alkali metal hydroxide, a compound (3) represented by the following Formula (3) is produced.

[Chem. 8]

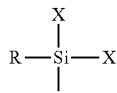
(2)

[Chem. 9]

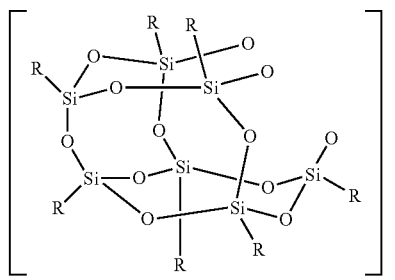
(3)

In Formula (3), M is not particularly limited as long as it is an alkali metal. As such an alkali metal, for example, lithium, sodium, potassium, and cesium, may be exemplified.

In Formulas (2) and (3), R corresponds to one group selected from among $R_f^1$ to $R_f^7$ in Formula (1) and independently represents a linear fluoroalkyl group having 1 to 20 carbon atoms or a branched fluoroalkyl group having 3 to 20 carbon atoms in which any methylene may be substituted with oxygen; a fluoroaryl group having 6 to 20 carbon atoms in which at least one hydrogen atom is substituted with fluorine or trifluoromethyl; or a fluoroarylalkyl group having 7 to 20 carbon atoms in which at least one hydrogen atom in an aryl group is substituted with fluorine or trifluoromethyl. In Formula (2), X represents a hydrolyzable group.

Preferably, in Formulas (2) and (3), R independently represents 3,3,3-trifluoropropyl, 3,3,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrododecyl, pentacosafluoro-1,1,2,2-tetrahydrotetradecyl, (3-heptafluoroisopropoxy)propyl, pentafluorophenylpropyl, pentafluorophenyl, or α,α,α-trifluoromethylphenyl.

More preferably, in Formula (2), R independently represents 3,3,3-trifluoropropyl or 3,3,4,4,5,5,6,6,6-nonafluorohexyl.

Next, the compound (3) is reacted with a compound (4) represented by the following Formula (4) to produce the fluorosilsesquioxane derivative (1).

[Chem. 10]

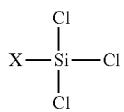
(4)

In Formula (4), the group X is a group represented by Formula (1-1) or Formula (1-2).

Among such fluorosilsesquioxane derivatives (1), γ-methacryloxypropylhepta(trifluoropropyl)-T8-silsesquioxane represented by the following Formula (5) is preferable.

[Chem. 11]

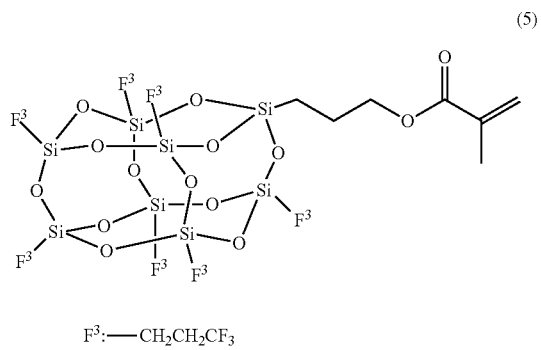

(5)

F³:——CH₂CH₂CF₃

γ-Methacryloxypropylhepta(trifluoropropyl)-T8-silsesquioxane is introduced into the urethane acrylate cured product constituting the top coating layer of the present invention and can further improve a stainproof function of the top coating layer.

An oligomer produced by crosslinking and/or polymerizing at least one compound selected from among compounds that can be used as the copolymer components in advance may be provided when the urethane acrylate is cured. When a structural unit derived from γ-methacryloxypropylhepta(trifluoropropyl)-T8-silsesquioxane is introduced into the urethane acrylate cured product constituting the top coating layer of the present invention, a crosslinked polymer obtained by copolymerizing the urethane acrylate, γ-methacryloxypropylhepta(trifluoropropyl)-T8-silsesquioxane, and at least one acrylate copolymer component selected from among a monofunctional acrylate, a bifunctional acrylate, and a multifunctional acrylate and a curable top coating solution including a polymerization initiator is polymerized in the presence of the polymerization initiator to form a top coating layer. In this case, as the crosslinked polymer, a crosslinked polymer obtained by polymerizing 100 parts by weight of γ-methacryloxypropylhepta(trifluoropropyl)-T8-silsesquioxane and 50 parts by weight to 150 parts by weight of the acrylate copolymer component is preferably used. Generally, such a crosslinked polymer of γ-methacryloxypropylhepta(trifluoropropyl)-T8-silsesquioxane is preferably present in a proportion of 0.01 parts by weight to 10 parts by weight, and preferably 0.05 parts by weight to 5 parts by weight with respect to 100 parts by weight of the urethane acrylate.

[1.4. Additives]

Additives such as an antioxidant, a weather-resistant stabilizer, a toning agent, and a diluent that are generally blended into a paint or film material can be blended into the top coating layer of the present invention. Blending amounts thereof are not limited as long as the function of the top coating layer does not deteriorate.

[2. Substrate Layer]

As a substrate layer of the laminated film of the present invention, a film including a polycarbonate thermoplastic polyurethane is used. The polycarbonate thermoplastic polyurethane is a thermoplastic polyurethane obtained by reacting a polycarbonate compound (polycarbonate diol) having a hydroxyl group at the terminal with an isocyanate compound and is a block copolymer including a polyurethane component as a hard segment and a polycarbonate as a soft segment. As the polycarbonate, an alkanediol carbonate, that is, a carbonate mainly including an alkane diol group having 2 to 10 carbon atoms, is generally used, and, for example, polyhexanediol carbonate, is used. As the isocyanate compound, the above-described compounds are used.

As such a polycarbonate thermoplastic polyurethane, for example, a polycarbonate thermoplastic polyurethane including a soft segment block having a polycarbonate diol unit having a number average molecular weight of 500 to 10,000 and an organic diisocyanate unit and a hard segment block having a chain extender selected from organic diols having a number average molecular weight of 60 to 400 and an organic diisocyanate unit is used. As such a polycarbonate thermoplastic polyurethane, a polycarbonate thermoplastic polyurethane including a diethyl carbonate unit or a diphenyl carbonate unit, a long chain polyol unit including a polyester polyol group having a 1,6-hexanediol unit, and a 4,4'-diphenylmethane diisocyanate unit as the soft segment block, and a 1,4-butanediol unit and a 4,4'-diphenylmethane diisocyanate unit as the hard segment block may be exemplified.

In the present invention, the thickness of the substrate layer is not particularly limited, and is generally 25 to 300 μm, and preferably 100 to 200 μm.

[3. Adhesive Layer]

The adhesive layer of the laminated film of the present invention includes a pressure sensitive adhesive. As the pressure sensitive adhesive used in the present invention, a known adhesive which exhibits adhesiveness at a PPF application temperature, that is, exhibits adhesiveness at a temperature of about 20° C. to about 30° C., and which is used for adhering a molded article made of a thermoplastic polyurethane material to an article made of glass, metal, plastic, or paper can be used without limitation. As such a pressure sensitive adhesive, a commercially available acrylic pressure sensitive adhesive and urethane pressure sensitive adhesive can be used. Preferably, an acrylic pressure sensitive adhesive is used. The thickness of the adhesive layer is not particularly limited, and is generally about 10 to 200 μm.

[4. Release Layer]

Figure 2:
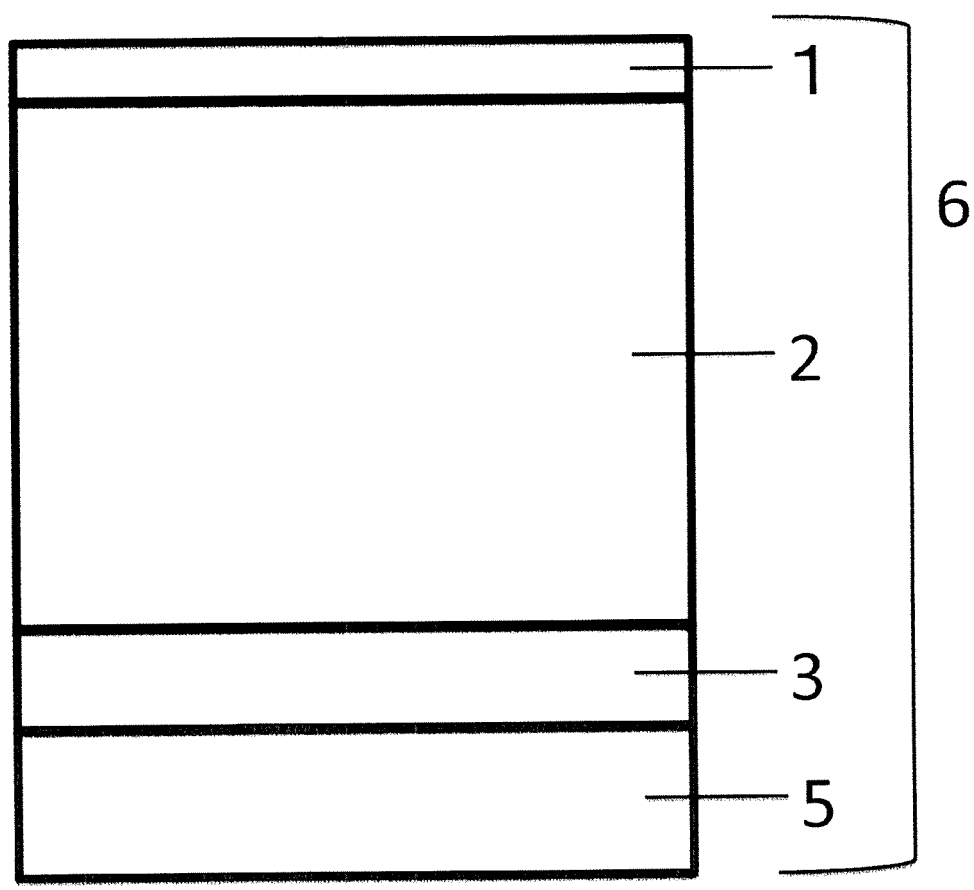
FIG. 2 is one example of a laminated film of the present invention.

A release layer can be additionally provided on a surface opposite to the substrate of the adhesive layer. For example, as shown in FIG. 2, a release layer 5 is provided on the adhesive layer 3, on a side opposite to where the substrate 2 is located, and these layers are laminated together with the top coating layer 1 located on the substrate 2 to form a laminated film 6. As a material of the release layer, a known release material is used without limitation. For example, a resin film such as a polyester resin and a polyolefin resin, a cellophane paper, a glassine paper, or those of which surfaces are coated with a fluorine or silicon release agent can be used. The thickness of the release layer is not particularly limited and is generally about 20 to 200 μm.

[5. Protective Layer]

In the laminated film of the present invention, a protective layer can be additionally provided on the outermost surface depending on the form of storage, transportation, and sale. A material of such a protective layer is not limited, and a generally used plastic film or released paper can be appropriately selected.

[6. Production of Laminated Film]

The laminated film of the present invention is produced by forming the top coating layer on one surface of the substrate and then forming the adhesive layer on the other surface of the substrate.

[6.1 Formation of Top Coating Layer]

The top coating layer of the present invention is formed by applying a top coating solution including the urethane acrylate, the polymerization initiator, and optionally the other copolymer components and/or the additives to one surface of the substrate layer, and curing and drying the top coating solution. As an application method at this time, a wet coating method is preferable in order to uniformly apply a top coating solution. As the wet coating method, a gravure coating method, a die coating method, or the like can be used.

The gravure coating method is a method in which a gravure roller having a surface on which an irregularity engraving process is performed is immersed in a coating solution, a coating agent adhered to an irregular part of the surface of the gravure roller is scraped off with a doctor blade, and the solution is stored in a concave part, is accurately weighed out, and transferred to a substrate. According to the gravure coating method, a low viscosity solution can be applied thinly.

The die coating method is a method in which coating is performed while applying a pressure to a solution from a coating head called a die and extruding. According to the die coating method, high precision coating is possible. Further, since the solution is not exposed to outside air during coating, a change in concentration of the coating agent due to drying hardly occurs.

As other wet coating methods, a spin coating method, a bar coating method, a reverse coating method, a roll coating method, a slit coating method, a dipping method, a spray coating method, a kiss coating method, a reverse kiss coating method, an air knife coating method, a curtain coating method, and a lot coating methods can be exemplified. A coating method can be appropriately selected from among such methods according to a required film thickness. Moreover, when the wet coating method is used, since coating can be performed at a line speed of several tens of meters per minute (for example, about 20 m/min), production of a large amount is possible and it is possible to increase production efficiency.

As a method of curing and drying a top coating solution, a general method for a photopolymerizable paint is used.

[6.2 Formation of Adhesive Layer]

As a method of applying a pressure sensitive adhesive on a surface opposite to the top coating layer of the substrate layer on which the top coating layer is formed, any of known methods, for example, a gravure coating method, a bar coating method, a spray coating method, a spin coating method, a roll coating method, a die coating method, a knife coating method, an air knife coating method, a hot melt coating method, and a curtain coating method, can be used.

When a release layer is provided on the laminated film of the present invention, a release layer including one surface to which an adhesive is applied according to the same method as the above method can be attached to a surface opposite to the top coating layer of the substrate layer on which the top coating layer is formed using a roller or the like.

[7. Use as PPF]

Figure 3:
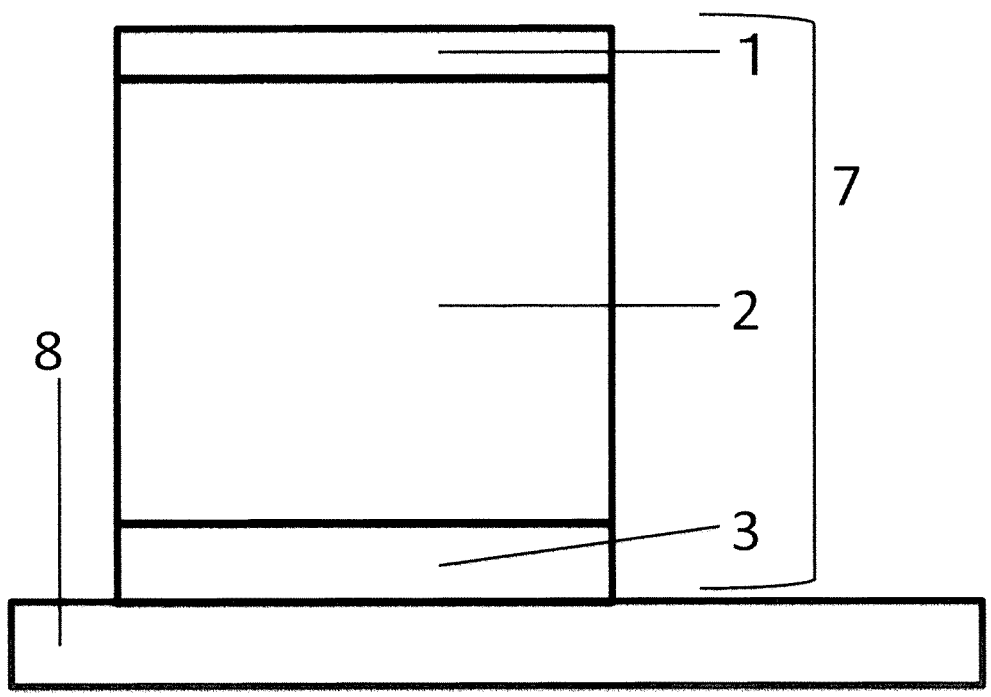
FIG. 3 is an example in which a laminated film of the present invention is used as a PPF.

The laminated film of the present invention completed as described above can be cut into an appropriate length unit, stacked, or wound and used as a PPF. When the PPF is applied, the laminated film of the present invention is cut into a shape conforming to an application surface, the cut laminated film is stretched with an appropriate force, and the adhesive layer is brought into close contact with the application surface. For example, as shown in FIG. 3, the top coating layer 1, the substrate layer 2 and the adhesive layer 3 are laminated together to form a laminated film 7 and used as a PPF, wherein the adhesive layer 3 of the laminated film 7 is brought into close contact with a coated surface 8.

In the laminated film of the present invention, the top coating layer excellent in strength, smoothness, water repellency, and oil repellency mitigates an external stimulation to the application surface. Along therewith, flexibilities and durabilities of the top coating layer, the substrate layer, and the adhesive layer and adhesions between the layers match. Therefore, the entire laminated film is in close contact with the application surface for a long time, and moreover, the laminated film can be removed from the application surface without causing a problem such as a residual adhesive layer on the application surface after application.

Examples

[Materials Used]
(Top Coating Solution Component)

The following materials were blended.

Urethane acrylate: a polymer A obtained according to the following procedure was used.

Here, 100.00 g of polycarbonate diol (DURANOL T5650E: commercially available from Asahi Kasei Corporation, hydroxyl value; 112 mg KOH/g) composed of 1,5-pentanediol/1,6-hexanediol and 38.90 g of isophorone diisocyanate (IPDI) was put into a 1 L three-neck flask to which a thermometer, a stirring device, and a reflux condenser were attached, 142.90 g of methyl ethyl ketone (MEK) as a solvent was put thereinto, and additionally, 0.02 g of dibutyltin dilaurate as a catalyst, and 0.07 g of dibutylhydroxytoluene (BHT) as an antioxidant were added thereto, and these were reacted at 75° C. for 4 hours. A reaction ratio at this time was polycarbonate diol/IPDI=71.99/28.01 (mass ratio). After the reaction for 4 hours, 4.30 g of HDI isocyanurate polyisocyanate (DURANATE TLA-100, NCO content: 23.2 mass %, commercially available from Asahi Kasei Corporation) and 4.30 g of MEK were put thereinto, and these were additionally reacted at 75° C. for 1 hour. After the reaction for 1 hour, 3.71 g of 2-isocyanatoethyl methacrylate (Karenz AOI: commercially available from Showa Denko), 0.08 g of methoquinone as a polymerization inhibitor, and 10.00 g of MEK were put thereinto, and 0.03 g of dibutyltin dilaurate as a catalyst was added, and these were additionally reacted at 75° C. for 3 hours, and 63.36 g of MEK was then put thereinto, and an MEK solution of a urethane acrylate copolymer was obtained. A molecular weight of the obtained polymer was 13,000, and a viscosity of the MEK solution (nonvolatile content 40%) was 21 mPa·s (25° C.). Therefore, a polymer A as a urethane acrylate was obtained.

Polymerization initiator: photopolymerization initiator "IRGACURE 127" commercially available from BASF.

Other copolymer components: perfluoroalkyl group-containing ethylene oxide adduct ("RS-75" commercially available from DIC), and a crosslinked polymer (*) of γ-methacryloxypropylhepta(trifluoropropyl)-T8-silsesquioxane.

Additives: "Tinuvin 292 and Tinuvin 479" (commercially available from BASF) as a weather-resistant stabilizer, and "blue pigment dispersion solution: CBD MIBK 15 WT %-R13 (commercially available from CIK Nanotech)" as a toning agent.

Organic solvent: methyl isobutyl ketone (MIBK).

(*) synthesized by the following method

Synthesis of γ-Methacryloxypropylhepta(Trifluoropropyl)-T8-Silsesquioxane

Trifluoropropyltrimethoxysilane (100 g), THF (500 ml), deionized water (10.5 g) and sodium hydroxide (7.9 g) were put into a four-neck flask with an internal volume of 1 liter to which a reflux condenser, a thermometer, and a dropping funnel were attached, and while stirring using a magnetic stirrer, heating was performed in an oil bath from room temperature until the temperature reached a temperature at which THF was refluxing. Stirring continued for 5 hours from when the refluxing started and a reaction was completed. Then, the flask was removed from the oil bath, was left at room temperature overnight, and then set again in the oil bath and heating and concentration were performed under a constant pressure until a solid was precipitated. The precipitated product was filtered using a pressure filter including a membrane filter with a pore size of 0.5 μm. Next, the obtained solid material was washed once with THF, dried at 80° C. for 3 hours using a reduced-pressure drying device, and 74 g of a white solid material powder was obtained.

The white solid material powder (1.0 g), THF (10 g), and triethylamine (1.0 g) were put into a four-neck flask with an internal volume of 50 ml to which a dropping funnel, a reflux condenser, and a thermometer were attached and sealing was performed with dry nitrogen. While stirring using a magnetic stirrer, chlorotrimethylsilane (3.3 g) was added dropwise at room temperature for about 1 minute. After the dropwise addition was completed, stirring additionally continued at room temperature for 3 hours, and a reaction was completed. Next, pure water (10 g) was put thereinto, sodium chloride (by-product) was dissolved and unreacted chlorotrimethylsilane was hydrolyzed. The reaction mixture obtained in this manner was moved to the separating funnel, and separated into an organic layer and an aqueous layer, and the obtained organic layer was repeatedly washed with water using deionized water until a washing solution became neutral. The organic layer was dried with anhydrous magnesium sulfate and concentrated under a reduced pressure using a rotary evaporator, and 1.2 g of a white solid material powder was obtained.

The obtained white solid material powder was subjected to structural analysis according to GPC, $^1$H-NMR, $^{29}$Si-NMR, and $^{13}$C-NMR. Based on the GPC chart, it was confirmed that the white solid material powder exhibited monodispersity, a molecular weight thereof was a weight average molecular weight of 1570 in terms of polystyrene, and a purity was 98 weight %. Based on the $^1$H-NMR chart, it was confirmed that a trifluoropropyl group and a trimethylsilyl group were present in an integral ratio of 7:3. Based on the $^{29}$Si-NMR chart, it was confirmed that there were three peaks derived from a T structure having a trifluoropropyl group at a ratio of 1:3:3, and there was one peak derived from a trimethylsilyl group at 12.11 ppm. Based on the $^{13}$C-NMR chart, it was confirmed that there were peaks derived from a trifluoropropyl group at 131 to 123 ppm, 28 to 27 ppm, and 6 to 5 ppm, and there was a peak derived from a trimethylsilyl group at 1.4 ppm. These values indicate that the white solid material powder subjected to structural analysis had a structure of the following Formula (6). TMS represents a trimethylsilyl group.

[Chem. 12]

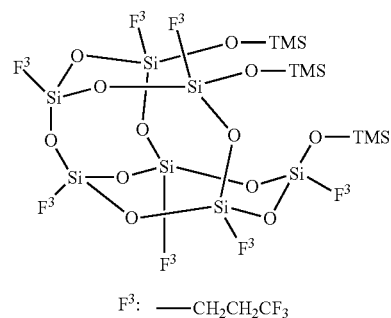

(6)

$F^3$: —$CH_2CH_2CF_3$

[Chem. 13]

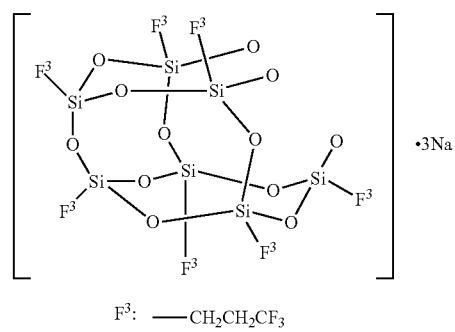

(7)

$F^3$: —$CH_2CH_2CF_3$

The compound (2.85 g) represented by Formula (7), THF (50 g), and triethylamine (0.4 g) were put into a three-neck flask with an internal volume of 100 milliliters to which a reflux condenser and a thermometer were attached and sealing was performed with dry argon. While stirring using a magnetic stirrer, 3-(methacryloyloxy)propyltrichlorosilane (1.0 g) was added dropwise at room temperature. After the dropwise addition was completed, stirring additionally continued at room temperature for 3 hours, and a reaction was completed. A reaction solution was pressed and filtered (argon pressure: 0.2 to 0.3 MPa, PTFE membrane filter: 0.1 μm) to remove sodium chloride (by-product). Next, after the filtrate was concentrated by a factor of ten, methanol (150 g) was then added, and a precipitate was obtained. The precipitate solution was stirred for 1 hour, and then filtered using a suction filter including a membrane filter with a pore size of 0.1 μm. The obtained solid component was dried at 80° C. for 3 hours using a reduced-pressure drying device, and a white solid material powder (1.6 g) was obtained.

The obtained white solid material powder was subjected to structural analysis according to gel permeation chromatography (GPC), $^1$H-NMR, $^{29}$Si-NMR, and $^{13}$C-NMR analysis. The results were as follows. Based on the GPC, it was confirmed that the white solid material powder was monodispersed, a molecular weight thereof was a weight average molecular weight of 1430 (not corrected) in terms of polystyrene, and a purity was 99%. Based on the $^1$H-NMR chart, it was confirmed that an integral ratio of trifluoropropyl and a terminal double bond of methacryloyloxy was 28:2. Based on the $^{29}$Si-NMR chart, it was confirmed that there were peaks of three types derived from a T structure having a 3-(methacryloyloxy)propyl group and a T structure having phenyl at a ratio of 1:4:3. Based on the $^{13}$C-NMR chart, it was confirmed that there were peaks derived from a 3-(methacryloyloxy)propyl group at 167 to 125 ppm, and 68 to 4 ppm, and there was a peak derived from a trifluoropropyl group at 131 to 123 ppm. According to such data, a structure represented by the following Formula (5) was supported. In this manner, γ-methacryloxypropylhepta(trifluoropropyl)-T8-silsesquioxane was obtained.

Crosslinking Polymerization of γ-Methacryloxypropylhepta(Trifluoropropyl)-T8-Silsesquioxane γ-methacryloxypropylhepta(trifluoropropyl)-T8-silsesquioxane (25 g), Silaplane FM0721 (6.3 g, commercially available from JNC), 2-hydroxylethyl methacrylate (18.8 g), methyl methacrylate (12.5 g), and methyl ethyl ketone (62 g) were put into a four-neck round-bottom flask to which a reflux device and a dropping funnel were attached and which was sealed with a nitrogen seal and refluxing and degassing were performed for 15 minutes using an oil bath. Then, a solution in which azobisisobutyronitrile (0.48 g), and mercaptoacetic acid (0.054 g) were dissolved in methyl ethyl ketone (4.8 g) was added to initiate polymerization. A solution of a copolymer obtained when, 3 hours after the polymerization was initiated, azobisisobutyronitrile (0.48 g) was dissolved in methyl ethyl ketone (4.3 g) and added, and aged for 5 hours was obtained. Moreover, as a polymerization inhibitor, paramethoxyphenol (0.16 g), and dibutyltin dilaurate (0.15 g, commercially available from Showa Denko) were dissolved in methyl ethyl ketone (1.5 g) and added thereto. Then, Karenz AOI (26.4 g) was added dropwise using a dropping funnel so that the temperature of the solution was changed from 35° C. to 50° C., and after the dropwise addition, aging was performed at 45° C. for 3 hours.

Then, methanol (9 g) was added for treatment and paramethoxyphenol (0.16 g) was then additionally added. When this mixture was diluted with methyl isobutyl ketone (107.3 g), a 30 weight % solution of a crosslinked polymer of γ-methacryloxypropylhepta(trifluoropropyl)-T8-silsesquioxane was obtained.

The obtained crosslinked polymer had a weight average molecular weight (Mw) of 42,000 and a polydispersity index (Mw/Mn) of 1.9. Here, the weight average molecular weight, and the polydispersity index were measured using gel permeation chromatography (GPC, model number: Alliance 2695, commercially available from Waters, column: Shodex GPC KF-804L×2 (in series), guard column: KF-G).

In this manner, a polymer having a crosslinked structure which is a reaction product of γ-methacryloxypropylhepta(trifluoropropyl)-T8-silsesquioxane, 2-hydroxylethyl methacrylate, and methyl methacrylate was obtained.

(Substrate Layer)

The following films including one surface to which a protective film made of polyethylene terephthalate with a thickness of 50 μm was attached were prepared.

Polycarbonate thermoplastic film: "Higress DUS450" (thickness of 150 μm) commercially available from Sheedom Co., Ltd.

Polycaprolactone thermoplastic film: commercially available from Nihon Matai Co., Ltd. "Esmer URS PX-98" (thickness of 150 μm) (for comparison)

(Adhesive Layer)

Acrylic pressure sensitive adhesive: "S8721" commercially available from Avery Dennison was prepared.

[Production of Laminated Film]

Materials of layers shown in Table 1 were blended to produce laminated films (Examples 1, 2, and 3) of the present invention and a laminated film for comparison (Comparative Example 1). Here, "crosslinked polymer" in Table 1 indicates the crosslinked polymer of γ-methacryloxypropylhepta(trifluoropropyl)-T8-silsesquioxane, and "cobalt blue" indicates cobalt blue fine particle powder (commercially available from CIK Nanotech). In Table 1, "-" indicates not blended in. A proportion (weight %) with respect to the total amount of the urethane acrylate cured product is suffixed to resin materials constituting the urethane acrylate cured product of the coating layer.

In all examples, the laminated films were prepared by the following procedure. First, an acrylic pressure sensitive adhesive was applied to a surface of a polycarbonate thermoplastic film of a substrate layer by die coating, and dried at 70° C. for 3 minutes. In this manner, an adhesive layer with a thickness of 40 μm was formed on one surface of the substrate layer.

Next, two polyethylene terephthalate films with a thickness of 75 μm which were released with a silicone resin were pressed using a rubber roller to sandwich the adhesive layer and the substrate layer, and covering was performed for one day in a environment at 45° C.

Then, the protective film made of polyethylene terephthalate in contact with the substrate layer was separated and a surface of the substrate layer was exposed. A top coating solution was applied to the exposed surface using a wire bar coater No. 30 (commercially available from R. D. S. Webster) and dried at 90° C. for 3 minutes. Then, the top coating solution was cured using a fusion UV lamp-mounted belt conveyor curing unit (commercially available from Heraeus) at a cumulative light amount of 850 mJ/cm². In this manner, the top coating layer with a thickness of 15 μm was formed on the substrate.

[Evaluation]

The laminated films were evaluated according to the following aspects. The results are shown in Table 1.

(1) Self-Repairing Property: Brass Brush Scratch Resilience Test

A 40 mm×130 mm piece was cut out from the laminated film, and a release film was removed from the piece. Separately, an aluminum plate (width 50 mm, length 150 mm, and thickness 1.2 mm) to which a black paint for automobiles was applied was prepared. A liquid (here, a baby shampoo (commercially available from Johnson & Johnson) was diluted by a factor of 10,000 on a volume basis) was sprayed to a surface of an adhesive layer of the laminated film piece and a coated surface of the aluminum coated plate. Then, the surface of the adhesive layer of the laminated film was brought into contact with the coated surface, the laminated film was pressed using a commercially available rubber squeegee while air bubbles and water bubbles generated between the laminated film and the coated surface were removed, and the laminated film was attached to the coated plate. The coated plate to which the laminated film was attached was left at room temperature until no air bubbles and water bubbles were visually observed on the surface. In this manner, a test sample was completed.

Using a surface measurement device TYPE14 (commercially available from Shinto Scientific Co., Ltd.) to which a 4-row brass brush (commercially available from AS ONE Corporation) was attached, scratching conditions were set as follows: pressing force: 1000 gf, brush movement speed 3000 mm/min, and brush movement path: 10 reciprocations with a linear reciprocation of 100 mm (one way). The surface of the top coating layer of the test sample was scratched.

After the scratching was completed, the surface of the top coating layer of the sample was visually observed. Based on a time from when the scratching was completed until scratch damage disappeared, a self-repairing property of the laminated film layer was determined according to the following criteria.

+: Scratch damage disappeared within 1 minute from when scratching was completed −: Scratch damage was still observed after 1 minute from when scratching was completed (2) Water Repellency: Measurement of Water Contact Angle A water contact angle of the top coating layer of the laminated film was measured using an automatic contact angle meter DMs-400 (commercially available from Kyowa Interface Science Co., LTD.). As probe water, distilled water (commercially available from Kanto Kagaku) for nitrogen and phosphorus measurement was used.

(3) Stainproof Property and Oil Repellency: Magic Ink Wiping Test

The surface of the top coating layer of the laminated film was drawn on with a black oily marker (commercially available from Sharpie) and repellency for the oily ink was observed. Additionally, the drawn on part was rubbed with nonwoven fabric (DUSper K-3 commercially available from Ozu Corporation) and a wiping off property of the oily ink was observed. The observation results were determined according to the following criteria.

+: Ink was repelled and cleanly wiped off.

−: Not wiped off.

(4) Extensibility: Elongation at Break Measure

A 35 mm×200 mm piece was cut out from the laminated film, and a release film was removed from the piece. This piece was used as a test sample. A breaking test of the test sample was performed using a tensile, compression, and bending tester Strograph VG (commercially available from Toyo Seiki Seisaku-sho, Ltd.) at a distance between chucks of 100 mm and a crosshead upward movement speed of 127 mm/min. A point at which cracks occurred in the surface of the test sample was visually detected and a movement distance (crosshead movement distance) from an initial position of the crosshead at the point was measured. An elongation at break was calculated by the following formula.

Elongation at break (%)=(crosshead movement distance (mm)/distance between chucks (100 mm))×100

(5) Lubricity: Squeegee Test

A 40 mm×130 mm piece was cut out from the laminated film and a release film was removed from the piece. This piece was used as a test sample. Separately, an aluminum plate (width 50 mm, length 150 mm, and thickness 1.2 mm) to which a black paint for automobiles was applied was prepared. A liquid (here, a baby shampoo (commercially available from Johnson & Johnson) was diluted by a factor of 10,000 on a volume basis) was sprayed to a surface of the adhesive layer of the test sample and a coated surface of the aluminum coated plate. Then, the surface of the adhesive layer of the laminated film was brought into contact with the coated surface, the laminated film was pressed using a commercially available rubber squeegee while air bubbles and water bubbles generated between the laminated film and the coated surface were removed, and the laminated film was attached to the coated plate. Lubricity (squeegee lubricity) of the laminated film at this time was determined according to the following criteria.

+: The squeegee slipped on the surface of the laminated film and the laminated film was attached without difficulty.

−: The squeegee caught on the surface of the laminated film and it was difficult to attach the laminated film.

(6) Initial Adhesive Strength: Maximum Stress at Tension

A 25 mm×180 mm piece was cut out from the laminated film and a release film was removed from the piece. This piece was used as a test sample. Separately, an aluminum plate (width 50 mm, length 150 mm, and thickness 1.2 mm) to which a black paint for automobiles was applied was prepared. The adhesive layer of the test sample was brought into close contact with the coated plate and the outer surface of the test sample was pressed using a rubber roller so that the test sample protruded from the coated plate in a longitudinal direction. Pressing conditions were as follows; roller weight: 2 kg, roller movement speed: 5 mm/s, and the number of times pressing was performed using a roller: one reciprocation was performed at both ends of the test sample. Then, the coated plate with which the test sample was in close contact was maintained in an environment of a temperature of 23±2° C. and a relative humidity of 50±5% for 20 minutes. Then, a force necessary to pull an end of the test sample which was not in close contact with the coated plate and separate the test sample from the coated plate was measured as an adhesive strength of the test sample. The adhesive strength was measured as the maximum stress when an end of the test sample was separated from the fixed coated plate using a tensile, compression, and bending tester (commercially available from Toyo Seiki Seisaku-sho, Ltd.) under conditions of a crosshead load of 100 N and a crosshead speed of 300 mm/min.

(7) Design Property: Lifting at End of Coated Plate

When the laminated film is applied to an automobile as a PPF, a completed design property is also required, and when the PPF caught on a rear side (non-coated surface) of the coated surface at the application end, if the PPF was separated from the coated surface at the application end (so-called "lifting" was observed), the design property of the coated surface after application was impaired. Here, the following operation test was performed and the design property of the laminated film when the laminated film was used as a PPF was evaluated.

A 25 mm×150 mm piece was cut out from the laminated film, and a release film was removed from the piece. Separately, an aluminum plate (width 50 mm, length 150 mm, and thickness 1.2 mm) to which a black paint for automobiles was applied was prepared. A liquid (here, a baby shampoo (commercially available from Johnson & Johnson) was diluted by a factor of 10,000 on a volume basis) was sprayed to a surface of an adhesive layer of the laminated film piece and a coated surface of the coated plate. Then, the surface of the adhesive layer of the laminated film was brought in contact with the coated surface so that the laminated film protruded 50 mm in length from the coated plate. Next, the laminated film was pressed using a commercially available rubber squeegee while air bubbles and water bubbles generated between the laminated film and the coated surface were removed, and the laminated film was attached to the coated plate. After 5 minutes, the coated plate to which the laminated film was attached was left on a flat working plate, and a state of an end of the laminated film attached to the coated surface was visually observed. Design properties of the application ends were determined according to the following criteria.

+: The laminated film was in close contact with an end of the coated surface, and so-called "lifting" was not observed. A coating color was reproduced through the laminated film, and an enforcement surface having an excellent design property was formed.

−: The laminated film was not in close contact with an end of the coated surface, and so-called "lifting" was observed.

Since an operation end appeared white, the design property of the coated surface was impaired due to application.

(8) Heat Resistance: Extension Stress Reduction Rate (%) after Heating

A 25 mm×150 mm piece was cut out from the laminated film, and a release film was removed from the piece. This piece was used as a test sample. The test samples were placed on upper and lower crossheads of a tensile, compression, and bending tester Strograph VG (commercially available from Toyo Seiki Seisaku-sho, Ltd.) so that a distance between chucks was 50 mm. The crosshead was moved upward at a speed of 500 mm/min to a position (distance between chucks: 75 mm) at which a distance between chucks was increased by 50%. A tensile strength (N) generated when the movement was completed was measured and a 50% extension stress $(P)(N/mm^2)$ was obtained from the following formula. Measurement was performed in two places, indoors (temperature 23° C.) and a constant temperature chamber (temperature 70° C.), and a 50% extension stress ($P_{23}$) at a temperature of 23° C. and a 50% extension stress ($P_{70}$) at a temperature of 70° C. were obtained.

50% extension stress $(P)(N/mm^2)$=tensile strength (N)/(width of laminate (25 mm)×thickness of laminate (150 μm))

Based on the obtained $P_{23}$ and $P_{70}$, a 50% extension stress reduction rate (%) after heating was calculated according to the following formula.

Extension stress reduction rate (%)=$|(P_{23}-P_{70})/P_{23}|\times 100$ (9) Weather Resistance: Color Difference (ΔE*ab)

A 50 mm×50 mm piece was cut out and a release film was removed from the piece. Separately, a white hard vinyl chloride resin plate (ES-9700A, Takiron) was prepared. A liquid (here, a baby shampoo (commercially available from Johnson & Johnson) was diluted by a factor of 10,000 on a volume basis) was sprayed to a surface of an adhesive layer of the laminated film piece and a coated surface of the hard vinyl chloride resin plate. Then, the surface of the adhesive layer of the laminated film was brought into contact with the hard vinyl chloride resin plate, the laminated film was pressed using a commercially available rubber squeegee while air bubbles and water bubbles generated between the laminated film and the coated surface were removed, and the laminated film was attached to the hard vinyl chloride resin plate.

The adhesive layer and the hard vinyl chloride resin plate were left at room temperature until no air bubbles and water bubbles remaining on the surfaces thereof were visually observed. Thus, the sample before UV deterioration was obtained. Color specification values $L^*_1$, $a^*_1$, and $b^*_1$ of the sample were measured using a spectrophotometer (CM-5, commercially available from Konica Minolta, Inc., regular reflection light removal (SCE) method, light emission diameter: 30 mm, light source: D65, diffuse illumination: 8° direction light reception).

On the other hand, a 50 mm×50 mm piece was cut out and the piece was subjected to a deterioration simulation using an ultraviolet fluorescent lamp type accelerated weathering tester QUV (commercially available from Q-LAB). As deterioration conditions, the following Steps 1, 2, and 3 (one cycle) according to ASTM G154 CYCLE 2 were performed over a total of 12 cycles. Ultraviolet rays were emitted from the side of the top coating layer of the sample.

Step 1: UV emission (UV emission amount: 0.71 W/m², temperature: 60° C., time: 4 hours)
Step 2: condensation (temperature: 50° C., time: 4 hours)
Step 3: return to Step 1

A release film was removed from the piece that had undergone such deterioration. Separately, a white hard vinyl chloride resin plate (ES-9700A, Takiron) was prepared. A liquid (here, a baby shampoo (commercially available from Johnson & Johnson) was diluted by a factor of 10,000 on a volume basis) was sprayed to a surface of an adhesive layer of the laminated film piece and a coated surface of the hard vinyl chloride resin plate. Then, the surface of the adhesive layer of the laminated film was brought into contact with the hard vinyl chloride resin plate, the laminated film was pressed using a commercially available rubber squeegee while air bubbles and water bubbles generated between the laminated film and the coated surface were removed, and the laminated film was attached to the hard vinyl chloride resin plate. The adhesive layer and the hard vinyl chloride resin plate were left at room temperature until no air bubbles and water bubbles remaining on the surface thereof were visually observed. Thus, the sample after UV deterioration was obtained. Color specification values $L^*_2$, $a^*_2$, and $b^*_2$ of the sample were measured under the same conditions as in $L^*_1$, $a^*_1$, and $b^*_1$.

A color tone difference (ΔE*ab) between the sample before UV deterioration and the sample after UV deterioration was obtained according to the following formula.

$$\Delta L^*=|L^*_1-L^*_2|$$

$$\Delta a^*=|a^*_1-a^*_2|$$

$$\Delta b^*=|b^*_1-b^*_2|$$

$$\Delta E^*ab=[(\Delta L^*)^2+(\Delta a^*)^2+(\Delta b^*)^2]^{1/2}$$

TABLE 1

| | | Example 1 | Example 2 | Example 3 | Comparative Example 1 | Comparative Example 2 |
|---|---|---|---|---|---|---|
| Top coating layer | Urethane acrylate (wt %) | Copolymer A (85.0) | Copolymer A (90.8) | Copolymer A (91.0) | Copolymer A (85.0) | Copolymer A (90.8) |
| | Polymerization initiator (wt %) | IRGACURE 127 (4.2) | IRGACURE 127 (4.5) | IRGACURE 127 (4.5) | IRGACURE 127 (4.2) | IRGACURE 127 (4.5) |
| | Other copolymer components (wt %) | RS-75 (4.2) Crosslinked polymer (0.2) | RS-75 (4.5) Crosslinked polymer (0.2) | RS-75 (4.5) — | RS-75 (4.2) Crosslinked polymer (0.2) | RS-75 (4.5) Crosslinked polymer (0.2) |
| | Additives (wt %) | TINUVIN 292 (2.1) TINUVIN 479 (4.2) | — | — | TINUVIN 292 (2.1) TINUVIN 479 (4.2) | — |

TABLE 1-continued

|  |  | Example 1 | Example 2 | Example 3 | Comparative Example 1 | Comparative Example 2 |
|---|---|---|---|---|---|---|
|  |  | CBDMIBK 15 WT %-R13 (0.1) | — | — | CBDMIBK 15 WT %-R13 (0.1) | — |
| Substrate layer |  | DUS450 | DUS450 | DUS450 | PX-98 | PX-98 |
| Adhesive layer |  | S8721 | S8721 | S8721 | S8721 | S8721 |
| Evaluation | (1) Self-repairing property | + | + | + | + | + |
|  | (2) Water repellency (water contact angle) (°) | 107 | 108 | 108 | 108 | 108 |
|  | (3) Stainproof property and oil repellency | + | + | + | + | + |
|  | (4) Extensibility: elongation at break (%) | 77.1 | 78.1 | 76.8 | 76.9 | 75.9 |
|  | (5) Lubricity | + | + | − | + | + |
|  | (6) Initial adhesive strength: maximum stress at tension (N/25 mm) | 7.2 | 7.4 | 7.6 | 7.3 | 7.5 |
|  | (7) Design property | + | + | + | + | + |
|  | (8) Heat resistance (stress reduction rate at 70° C.) (%) | 38 | 39 | 37 | 56 | 59 |
|  | (9) Weather resistance: color difference (ΔE*ab) | 0.54 | 1.11 | 1.09 | 4.19 | 5.54 |

As shown in Table 1, in the laminated films of the present invention, a decrease in extension stress after heating was reduced, and moreover, a change in color tone according to UV deterioration was reduced. Therefore, it can be understood that the laminated films of the present invention had excellent heat resistance and weather resistance. Moreover, as shown in Table 1, the laminated films of the present invention had excellent balance between various aspects of performance such as the self-repairing property, the water repellency, the stainproof property and oil repellency, the extensibility, the lubricity, the initial adhesive strength, and the design property. On the other hand, the laminated films of the comparative examples had unfavorable heat resistance and weather resistance.

INDUSTRIAL APPLICABILITY

The laminated film of the present invention having excellent heat resistance and weather resistance and having excellent balance between the water repellency, stainproof property and oil repellency, extensibility, lubricity, initial adhesive strength, and design property is highly useful as a PPF. Objects to which the PPF made of the laminated film of the present invention can be applied, can be expected to be a wide range of objects such as ships, buildings, electronic products, display products, interior finishings, furniture, factory facilities, industrial devices, and medical devices in addition to vehicles such as automobiles and motorbikes.

What is claimed is:
1. A laminated film having a three-layer structure in which a top coating layer comprising an urethane acrylate and a fluorine-containing compound, a substrate layer consisting of polycarbonate thermoplastic polyurethane, and an adhesive layer made of a pressure sensitive adhesive are in contact in that order, wherein an amount of the fluorine-containing compound is 0.1 parts by weight to 10 parts by weight with respect to 100 parts by weight of the urethane acrylate, and the polycarbonate thermoplastic polyurethane has a soft segment block and a hard segment block, the soft segment block has a polycarbonate diol unit having a number average molecular weight of 500 to 10,000 and an organic diisocyanate unit, and the hard segment block has a chain extender selected from organic diols having a number average molecular weight of 60 to 400 and an organic diisocyanate unit.

2. The laminated film according to claim 1, wherein the fluorine-containing compound comprises a structural unit derived from a fluorosilsesquioxane derivative represented by the following Formula (1),

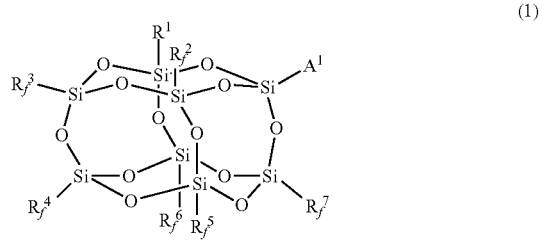

(1)

in Formula (1), $R_f^1$ to $R_f^7$ each independently represent a linear fluoroalkyl group having 1 to 20 carbon atoms or a branched fluoroalkyl group having 3 to 20 carbon atoms in which any methylene may be substituted with oxygen; a fluoroaryl group having 6 to 20 carbon atoms in which at least one hydrogen atom is substituted with fluorine or trifluoromethyl; or a fluoroarylalkyl group having 7 to 20 carbon atoms in which at least one hydrogen atom in an aryl group is substituted with fluorine or trifluoromethyl, and $A^1$ is a group represented by the following Formula (1-1) or Formula (1-2),

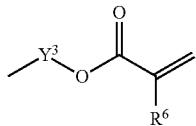
(1-1)

in Formula (1-1), $Y^3$ represents an alkylene group having 2 to 10 carbon atoms, and $R^6$ represents hydrogen or a linear alkyl group having 1 to 5 carbon atoms or a branched alkyl group having 3 to 5 carbon atoms, or an aryl group having 6 to 10 carbon atoms,

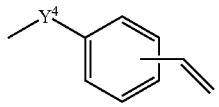
(1-2)

in Formula (1-2), $Y^4$ represents a single bond or an alkylene group having 1 to 10 carbon atoms.

3. The laminated film according to claim 1, wherein the fluorine-containing compound comprises a structural unit derived from γ-methacryloxypropyl-hepta(trifluoropropyl)-T8-silsesquioxane represented by the following Formula (5),

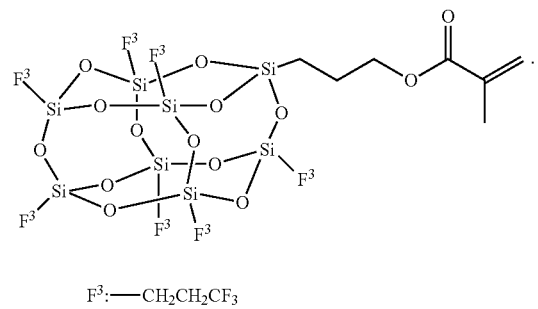
(5)

$F^3$: —$CH_2CH_2CF_3$

4. The laminated film according to claim 1, further comprising a release layer.

5. A paint protection film (PPF) comprising the laminated film according to claim 1.

* * * * *